(12) United States Patent
Thorat

(10) Patent No.: US 9,703,551 B2
(45) Date of Patent: Jul. 11, 2017

(54) MODIFYING MOBILE APPLICATION BINARIES TO CALL EXTERNAL LIBRARIES

(71) Applicant: Nishant Thorat, Pune (IN)

(72) Inventor: Nishant Thorat, Pune (IN)

(73) Assignee: CA, Inc., New York, NY (US)

( * ) Notice: Subject to any disclaimer, the term of this patent is extended or adjusted under 35 U.S.C. 154(b) by 130 days.

(21) Appl. No.: 14/262,864

(22) Filed: Apr. 28, 2014

(65) Prior Publication Data
US 2015/0309789 A1   Oct. 29, 2015

(51) Int. Cl.
G06F 9/44 (2006.01)
G06F 9/445 (2006.01)
G06F 11/34 (2006.01)

(52) U.S. Cl.
CPC ............ G06F 8/71 (2013.01); G06F 9/44521 (2013.01); G06F 11/34 (2013.01)

(58) Field of Classification Search
CPC ........... G06F 8/24; G06F 9/4428; G06F 9/465
See application file for complete search history.

(56) References Cited

U.S. PATENT DOCUMENTS

| 6,230,312 B1* | 5/2001 | Hunt ................. G06F 9/443 707/999.01 |
| 8,161,012 B1* | 4/2012 | Gerraty .............. G06F 21/53 707/687 |
| 8,495,664 B2* | 7/2013 | Herta ................ G06F 9/548 719/330 |
| 8,832,648 B2* | 9/2014 | Smith ................ G06F 9/542 709/220 |
| 2007/0157171 A1* | 7/2007 | Eastham ............... G06F 8/71 717/121 |
| 2013/0080634 A1 | 3/2013 | Grelewicz et al. |
| 2013/0332898 A1* | 12/2013 | Gall ................ G06F 9/4428 717/108 |
| 2014/0007117 A1* | 1/2014 | Sima ................. G06F 8/65 718/102 |
| 2014/0181803 A1* | 6/2014 | Cooper ............... G06F 8/60 717/178 |
| 2014/0380282 A1* | 12/2014 | Ravindranath Sivalingam ........ G06F 11/3466 717/128 |

OTHER PUBLICATIONS

Using external functions and subroutines, IBM, 2014, retrieved online on Apr. 7, 2017, p. 1. Retrieved from the Internet: <URL: https://www.ibm.com/support/knowledgecenter/en/SSLTBW_2.1.0/com.ibm.zos.v2r1.bpxb600/bpx1rx22.htm>.*
Ron Shuchat, Insight: Application Management in the Cloud—New Relic Turns a Traditional Model on its Ear, IDC, Feb. 2012.

* cited by examiner

*Primary Examiner* — Tuan Q. Dam
*Assistant Examiner* — Hanh T Bui
(74) *Attorney, Agent, or Firm* — Baker Botts L.L.P.

(57) ABSTRACT

A method includes determining a system library method based on a configuration file in an application library. The method also includes generating a wrapper method for the system library method, wherein the wrapper method includes a first instruction to invoke the system library method, and a second instruction to invoke a method in an external library. The method further includes replacing a third instruction that invokes the system library method with a fourth instruction that invokes the wrapper method. A binary class in a plurality of binary classes in the application library comprises the third instruction.

20 Claims, 9 Drawing Sheets

MODIFYING MOBILE APPLICATION BINARIES TO CALL EXTERNAL LIBRARIES

BACKGROUND

The disclosure relates generally to modifying mobile application binaries, and specifically to modifying mobile application binaries to call external libraries.

SUMMARY

According to one embodiment of the disclosure, a method includes determining a system library method based on a configuration file in an application library. The method also includes generating a wrapper method for the system library method, wherein the wrapper method includes a first instruction to invoke the system library method, and a second instruction to invoke a method in an external library. The method further includes replacing a third instruction that invokes the system library method with a fourth instruction that invokes the wrapper method. A binary class in a plurality of binary classes in the application library comprises the third instruction.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

DETAILED DESCRIPTION

Figure 1:
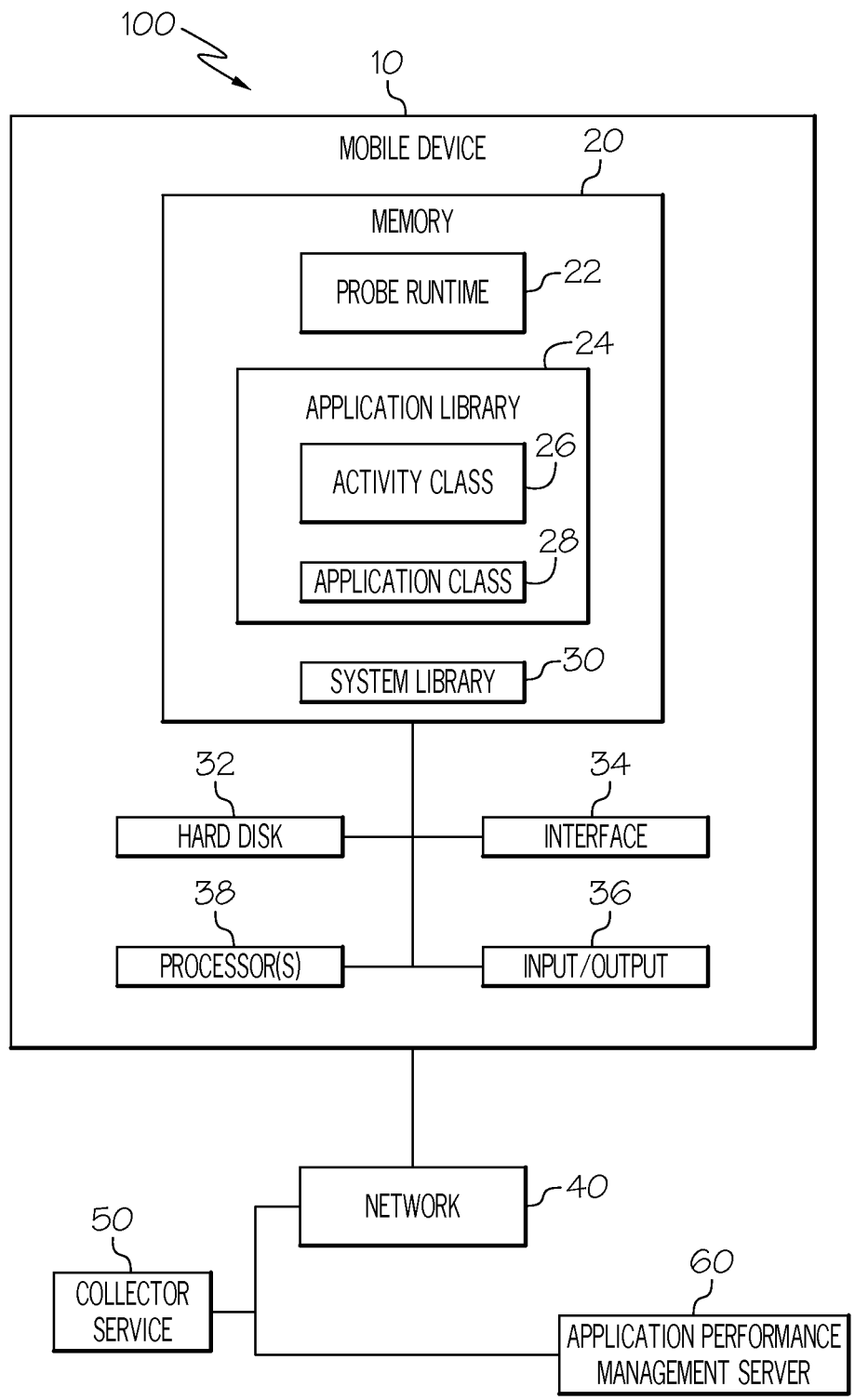
FIG. 1 illustrates a block diagram of a system for modifying mobile application binaries to call external libraries in accordance with a particular non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Applications developed for mobile operating system platforms pose different design challenges than their desktop counterparts. While the programming languages, syntax, and semantics of development for mobile applications may seem familiar to desktop developers, the runtime execution environment is different from a traditional desktop runtime execution environment. For example, the ANDROID™ operating system family includes an application framework that allows developers to program mobile applications using Java. However, Java applications developed for desktop applications are executed on a Java Virtual Machine ("JVM"), while Java applications developed for mobile applications are executed on a Dalvik Virtual Machine. Execution specifics vary between these two environments. Thus, traditional dynamic instrumentation techniques that rely on specifics of the Java Virtual Machine for proper execution may not be effective on mobile applications developed for mobile operating systems.

Other instrumentation techniques may also not be effective on mobile operating system platforms due to the limited resources available on mobile platforms. Additionally, instrumentation libraries may not be ported for use in these environments, and system library design and mobile processing execution rules may require prohibitively expensive processing operations or other resource draining activities when using certain desktop instrumentation techniques.

In certain embodiments, the systems and methods presented in the present disclosure may enable one of ordinary skill in the art to implement a static instrumentation scheme on compiled Java binaries that may enable instrumentation of mobile applications deployed on ANDROID™ or other mobile operating systems.

With reference to FIG. 1 a system 100 for modifying mobile application binaries to call external libraries is disclosed in accordance with a non-limiting embodiment of the present disclosure. System 100 includes mobile device 10, collector service 50, and application performance management server 60. Mobile device 10 includes memory 20, processor(s) 38, hard disk 32, interface 34, and input/output 36. In certain embodiments, mobile application library 24 is deployed to mobile device 10. A mobile application may include compiled binary files such as application library 24 that includes an activity class 26 and an application class 28. In certain embodiments, application library 24 may dynamically link to system and third party libraries running on the target device in the runtime environment. For example, application library 24 may include references to system library 30 and probe runtime 22. System library 30 may include libraries that contain core application framework functionalities, such as file input/output, web service request and response libraries and core data types. Probe runtime 22 may include functionality for extracting information from processes running either on mobile device 10, on collector service 50, or on application performance management server 60.

The descriptions in the present disclosure may refer to embodiments relating to the application performance management field. However, the teachings of the present disclosure may provide a system and method for more general modification of mobile application binaries such that other functionality may be embedded within compiled application binary code files. For example, binary application libraries from third parties may be modified to implement security policies. Thus, while the examples may be specific to instrumentation and application performance management, the teachings of the present disclosure may be applicable to a wide array of mobile applications and fields.

In certain embodiments, an instrumentation tool/library may analyze application library 24 and modify binary code files present in application library 24. For example, the instrumentation tool/library may analyze and modify activity class 26 and application class 28, and may add new classes and methods to application library 24. In certain embodiments, may analyze and modify other classes and methods in application library 24.

In certain embodiments, modifications may be made to application library 24 before application library 24 is deployed to mobile device 10. For example, application performance management server 60 may modify application library 24 so that instrumentation, or other post-development functionalities, are implemented on application library 24 before deployment.

The term "directly extends" may refer to an object oriented programming concept incorporating the principles of inheritance, polymorphism and abstraction. In certain embodiments, the term "directly extends" refers to a first class inheriting some functionality from a second class by implementing members of the second class. In this instance, directly extends refers to the first level of inheritance, i.e., one level up in the class hierarchy.

Figure 2:
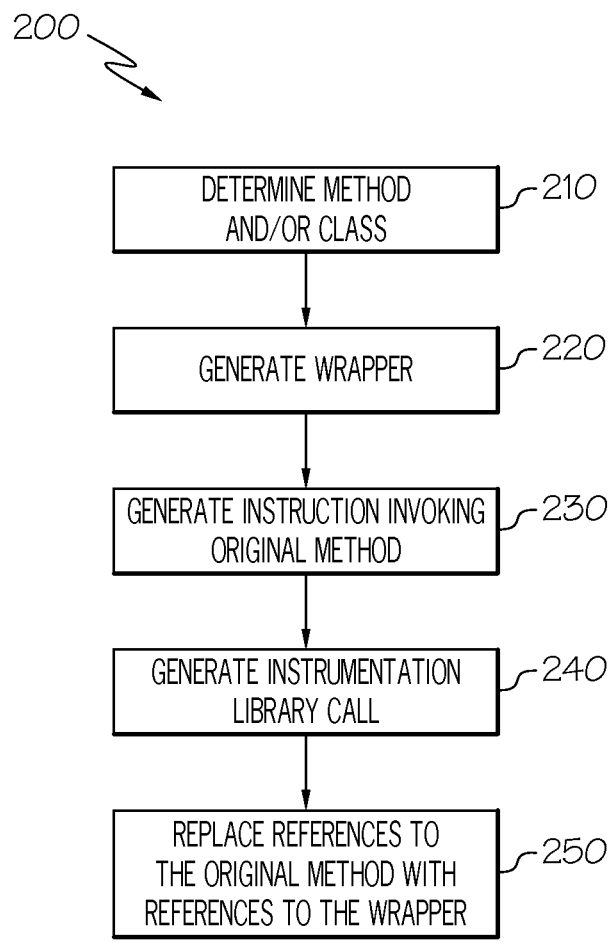
FIG. 2 illustrates a flow chart of a method for modifying mobile application binaries to call external libraries in accordance with a non-limiting embodiment of the present disclosure.

With reference to FIG. 2, a flowchart of a method for modifying mobile application binaries to call external libraries is illustrated in accordance with a non-limiting embodiment of the present disclosure. At step 210, a method and/or class is determined from a mobile application library based on a configuration file. The configuration file may specify areas in application execution where instrumentation is desired by specifying an extensible markup language ("XML") element with attributes and sub-elements that specify classes and methods in which to insert instrumentation code and/or method calls to other libraries that execute instrumentation functions.

The configuration file may be implemented in any suitable format that enables specifying such program classes, methods, or other constructs. For example, a simple text file with any type of delimiter may be used to specify code constructs.

For example, a system administrator may want to know how applications are performing across devices distributed to company employees. The administrator may want to know if any applications are draining battery, memory, or other resources. Application performance management software may enable a system administrator to view statistics as to how applications are performing on devices throughout an organization. The system administrator may specify specific points in application execution at which to measure performance of the application. In certain embodiments, a configuration file assists in this process by providing a map of which binary classes and methods should be instrumented.

In certain embodiments, the configuration file may specify a class and a list of methods in that class. For example, ANDROID™ applications may have Application classes that handle startup and shutdown of the application. The Application class may provide a hook for a series of entry points to application execution. These hooks or entry points may be specified on a super class that may be a system base class. The Application class may extend a system base class and override various entry points. Thus, the application developer may specify specific functionality when various events in the application are triggered, such as application startup.

In certain embodiments, the configuration file may contain an XML element with a class name attribute that specifies a class. The XML element may also contain sub-elements and other attributes that specify one or more method names. The methods identified in the configuration file may indicate methods in an application library where instrumentation functions are required.

The configuration file may further specify the probe runtime library function to call. For example, some instrumentation libraries may have a probe process running on the mobile operating system. The probe process may report back to a collection service and/or an application performance management server. The configuration file may specify that a probe process function is to be called at application startup.

In certain embodiments, the configuration file may specify any external library or internal application library target function to call. For example, calls to a security library may be specified in the configuration file.

At step 220, a wrapper method/class is generated. The wrapper method may call the target method identified in the configuration file. The wrapper method may also call the probe runtime library function. In certain embodiments, the wrapper method may be generated in a utility class, or may be added to the original target class. In certain embodiments, the wrapper class may contain a copy of the instructions in the target class instead of a reference to the target class method.

In certain embodiments, a routing class may be generated. Instances of the routing class may be used instead of instances of the target class. The routing class may route method calls from instances of the routing class to instances of the target class. External library calls may be inserted before and after calls to target class members and methods. For example, probe runtime library calls may be inserted so that the performance of certain method calls may be monitored.

In certain embodiments, a wrapper method may wrap a system library. For example, a mobile application may be deployed to a mobile platform and may dynamically link to system libraries present on the mobile operating system platform. A wrapper class and/or method may be generated to wrap functionalities available in system libraries. The wrapper class may wrap system libraries even though the target binary containing the target method or class may not be present in the distributed version of the mobile application.

At step 230, an instruction invoking the original target method is generated. As discussed above, the instruction may be inserted in the wrapper method and/or class.

At step 240 an instruction invoking a probe runtime library method is generated. The instruction may be inserted in the wrapper method and/or class. In certain embodiments, other types of external library instructions are generated and inserted. For example, a security library instruction may be inserted to encrypt data or perform other security operations.

At step 250 references in the application binaries to the original target method and/or class are replaced with references to the wrapping method and or class. For example, each target method reference in the application binary is replaced with an instruction that calls the wrapper method. As another example, each target class reference in the application binaries is replaced with an instruction that references the wrapped class.

As yet another example, a system library provides a library to generate an http web requests on the mobile platform. The system library class may be called HttpURLConnection. A routing class may be generated to measure the performance of calls to the HttpURLConnection class. The routing class may be called HttpURLConnectionRouter. References to the HttpURLConnection class may be replaced with references to the HttpURLConnectionRouter class throughout the application files.

In certain embodiments, these modified binary files are repackaged with the application files and deployed to a mobile device. For example, the modified libraries may be packaged in an ANDROID™ Application Package file (i.e., an .apk file).

In certain embodiments, the teachings of the present disclosure may be adapted for use in LINUX® kernel based operating systems. As described above, the teachings of the present disclosure may be adapted for use in any operating system in the ANDROID™ operating system family. The ANDROID™ operating system may have an application framework that allows developers to write applications in Java.

In certain embodiments, the Java application code developed for use on ANDROID™ systems may not run on a JVM. This execution approach differs from Java code written for Java application running on Mac or Personal Computer based operating systems such as Mac OS X, Windows, and/or Linux operating systems. In these operating systems, code may be compiled into byte code without regard to the target deployment platform. The byte code is then executed on various operating systems through the JVM in a mostly platform independent manner.

Instead of this approach, the ANDROID™ platform may provide its own virtual machine for executing Java applications. The Dalvik Virtual Machine may provide an optimized runtime for smartphones. Similar to the Mac or PC approach, Java applications written for the ANDROID™ platform are compiled into Java byte code on the development and/or build machine, and then converted into Dalvik Virtual Machine byte code. In certain embodiments, this byte code format may be referred to as dex format. An integrated development tool such as DX studio may perform the code conversion.

In certain embodiments, the ANDROID™ application, originally written in Java, may be bundled as a monolithic binary file (i.e., an Android Application Package file, or .apk file). This file is created by merging the classes output from the dx tool, and other application specific files, such as resource files and XML manifest and configuration files. An example .apk file might contain a classes.dex file, an AndroidManifest.xml file, an assets file, and a resources file.

In certain embodiments, the ANDROID™ system may require that all installed applications be digitally signed with a certificate whose private key may be held by the application developer. ANDROID™ systems may use a certificate to identify the author if an application, and may use the certificate to establish trust relationships between applications.

In certain embodiments, instrumentation may refer to any measurement and control of process variables within a particular device, network of devices, or any other grouping of devices. For example, an application performance management application may use instrumentation to measure performance, utilization, usage, consumption of resources, productivity, and other variables associated with an organization's IT resources.

In certain embodiments, runtime performance of ANDROID™ applications may be measured. To measure application performance, the ANDROID™ applications may need to be instrumented. Typically (i.e., on other platforms), instrumentation libraries may be provided for a virtual machine that allow for dynamic instrumentation of applications running on that virtual machine. For example, Java provides a built-in instrumentation option through the "—javaagent" switch to the Java Virtual Machine. Java libraries may support instrumentation, such as the java.lang.instrumentation classes. These classes may simplify instrumentation of Java applications running on the Java Virtual Machine. However, the ANDROID™ platform Dalvik Virtual Machine may not support these instrumentation libraries.

The ANDROID™ platform may also present some specific design constraints based on the inherently limited nature of mobile hardware architecture. For example, since the ANDROID™ platform was created for mobile devices, processing power, memory, and storage may be constrained by available hardware resources.

However, ANDROID™ systems may have minimum device requirements. For example, ANDROID™ systems may require an ARM-based chipset, 128 MB Random Access Memory, at least 256 MB external flash, and several other standard interfaces and components. In certain embodiments, to ensure that these minimum system requirements are utilized in an efficient manner, a virtual machine may be used. The virtual machine may also provide a sandbox for application execution. A sandbox may refer to an isolated storage or memory space for running applications in a controlled and self-contained environment. For example, access, permissions, and available resources may be controlled for applications running in a sandbox.

In certain embodiments, each application instance may run in its own virtual machine instance. Virtual machine instances should be able to start quickly when a new application is launched and the memory footprint of the virtual machine should be minimized.

ANDROID™ operating systems may use a Zygote to enable both sharing of code across virtual machine instances and to provide fast startup time for new virtual machine instances. The Zygote may include a virtual machine process that starts at system boot time. The Zygote process may initialize a Dalvik Virtual Machine that pre-loads and pre-initializes core library classes. In certain embodiments, these core library classes may be read-only and may be good candidates for sharing use across processes and virtual machines.

In certain embodiments, core library classes that are shared across virtual machine instances are generally not written to by applications. The library classes are generally only read by applications. However, when the core library classes are written to, the memory from the shared Zygote process may be copied to the forked child process of the application's virtual machine. This behavior is sometimes referred to as copy-on-write. The copy-on-write behavior may allow for sharing of memory while still preventing applications from interfering with each other and providing security across application and process boundaries.

In conventional applications, Java byte code executes on a JVM. Each instance of the virtual machine may have a copy of any core library class files and any associated heap objects. Memory may not be shared across instances in conventional Java applications. Thus, special consideration must be given to this constraint when developing ANDROID™ applications.

The above described design constraints should be considered in designing systems for ANDROID™ application performance management and instrumentation of ANDROID™ applications. For example, in designing Java instrumentation code for Java applications that will run in JVM instances, the class byte code may be modified dynamically. This may include modification of system library classes. However, modifying system library classes on ANDROID™ systems may lead to the above described copy-on-write to be triggered. Thus, memory consumption may be increased on ANDROID™ platforms if application instrumentation code is not designed with these special considerations in mind.

In certain embodiments, dynamic instrumentation of applications on ANDROID™ systems may compromise the stability of the platform. Thus, the techniques for instrumenting applications on ANDROID™ systems include mainly static instrumentation.

In certain embodiments, the teachings of the present disclosure may enable static instrumentation of ANDROID™ applications while building the application. For example, the instrumentation may be added to the source code of an application when the source code is available.

In certain embodiments, the teachings of the present disclosure may enable static instrumentation on the generated binary of a Java application where no access to source code is provided.

Figure 3:
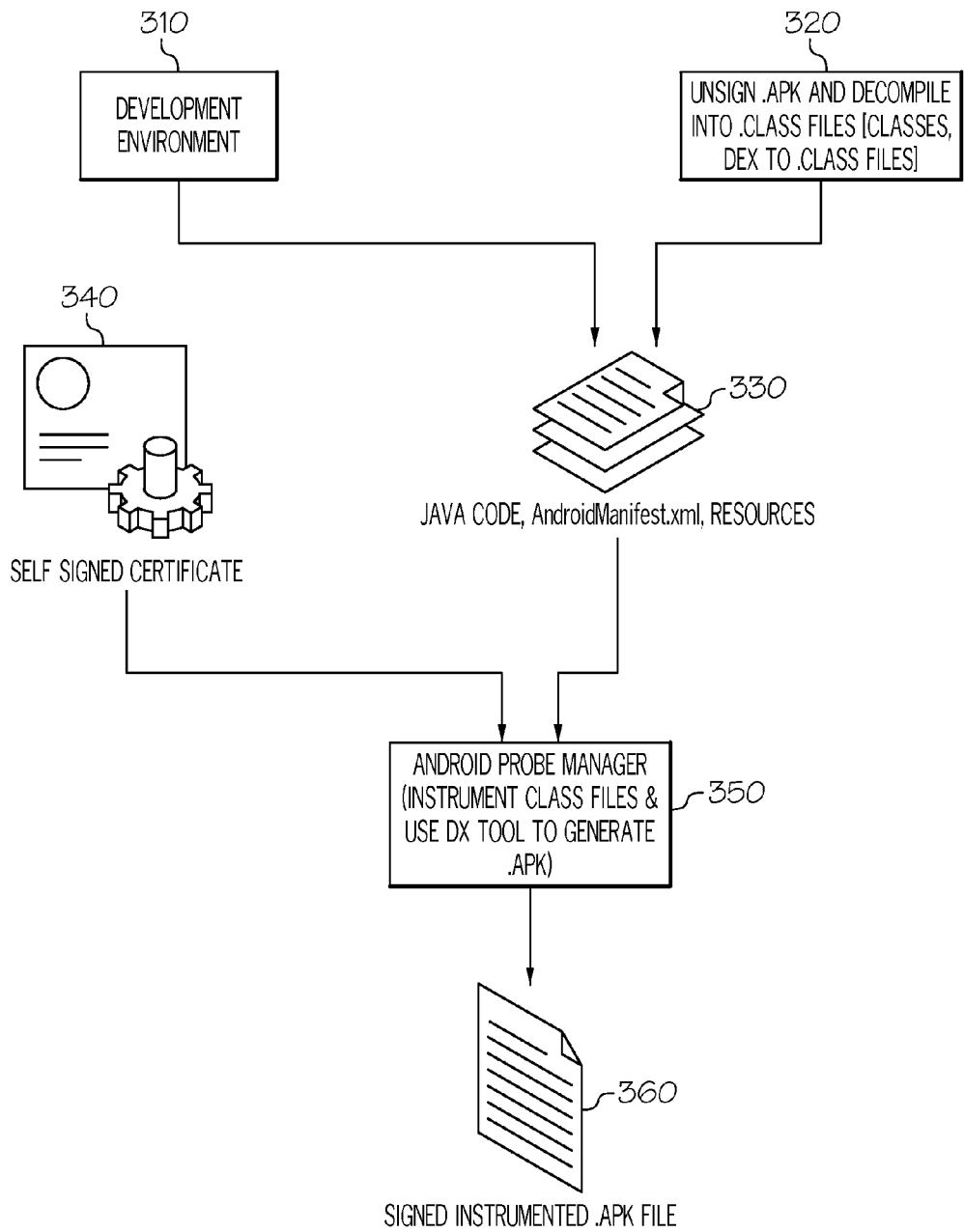
FIG. 3 illustrates a workflow diagram of static instrumentation of a mobile application binary in accordance with a non-limiting embodiment of the present disclosure.

With reference to FIG. 3, an example static instrumentation workflow is illustrated in accordance with a non-limiting embodiment of the present disclosure. Software developers use development environment 310 to develop mobile applications. This may result in the generation of signed .apk application packages. In certain embodiments, these compiled packages have their signature removed.

They are then decompiled into the application's constituent class files, such as Java code, AndroidManifest.xml, and resource files 330. The specified classes and methods may be instrumented (i.e., modified to insert instrumentation library instructions) using Android Probe Manager 350. A DX tool may be used to regenerate the .apk file with a self-signed certificate so that the application may run on the ANDROID™ platform when deployed and installed. A signed, instrumented .apk file is output at step 360 and is ready for deployment on a mobile device.

The static instrumentation workflow illustrated in FIG. 3 specifies an example workflow for how instrumentation classes for ANDROID™ applications may be generated and deployed for use in an application performance management system. A performance management system may, generally, contain many tools and systems for tracking and managing the performance of various system nodes.

In certain embodiments, the performance management system has a static instrumentation aspect, where generated code is instrumented. The performance management system may also have a dynamic instrumentation aspect, where the probe runtime may collect metrics and forward information to a collector service running on a separate component over a network.

Figure 4:
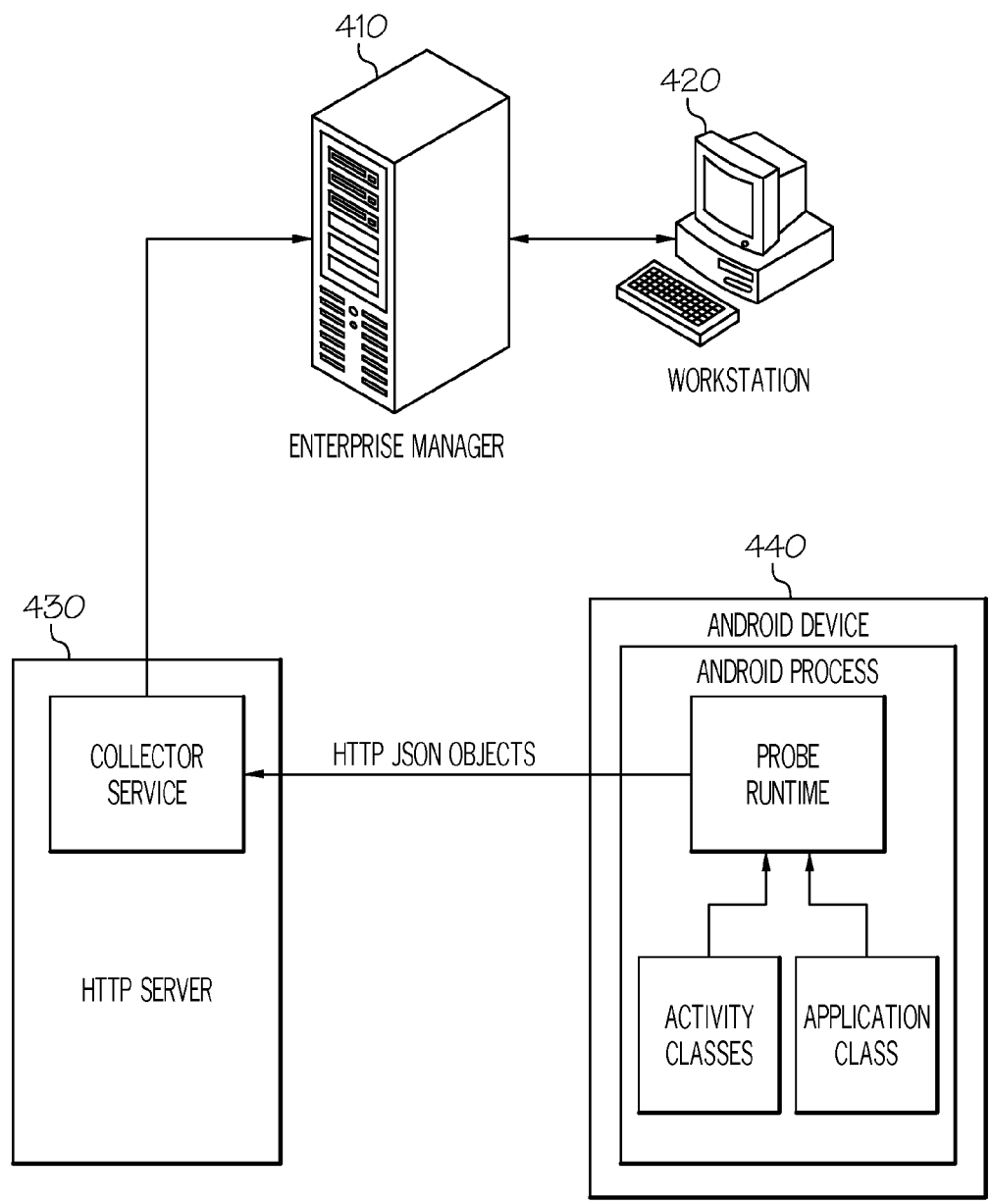
FIG. 4 illustrates a block diagram of application performance management for a mobile application in accordance with a non-limiting embodiment of the present disclosure.

The performance management system may also include a static instrumentation tool, i.e., Android Probe Manager 350 from FIG. 3. The performance management system may further include a probe runtime, a collector service, and an enterprise manager and workstation, as illustrated in FIG. 4.

In certain embodiments, Android Probe Manager 350 is a tool that inserts instrumented code into generated class files. This functionality may be integrated into the development environment so that developers need not explicitly use tools. For example, a developer may use a command to generate a debug build of an application and install that build on a default device. In this example, the developer may set settings which enable or disable instrumentation insertion, through a properties file.

In certain embodiments, an ant.properties file may include instrumentation settings. For example, an ant.properties file may include a ca.apm.instrumentation.enabled=true setting that may enable static instrumentation.

Android Probe Manager may expect certain inputs. For example, Android Probe Manager 350 may receive a series of arguments, such as a class path to the java class files, a self-signed certificate, a path to the ANDROID™ application project directory, probe seeds (discussed below), and the ANDROID™ application resources files and manifest files.

In certain embodiments, the ANDROID™ applications detailed in the present disclosure may be built around two major class hierarchies: the Activity (i.e., android.app.Activity) class, and the Application (i.e., android.app.Application) class.

The Activity class hierarchy may represent the user interface of any application. An Activity includes an application component that provides a screen where users can interact in order to accomplish some task. Activity classes may communicate with other Activities through Intents. Intents include messages that link core components of ANDROID™ applications, such as Activities, Services, and Broadcast Receivers.

The ANDROID™ application framework class "com.android.activity" may be the root class for any developed Activity. This framework class may assist in collecting user interface information. For example, the "com.android.activity" class may help collect information such as whether the application is in the background or in the foreground, which activity has started and which has ended, and/or the contents of any available Intent information. This information may reside on and help to build the user interface activity stack.

In certain embodiments, adhering to basic patterns and methods for instrumentation development will help to efficiently instrument applications on ANDROID™ systems. This is in part due to the unique design of the ANDROID™ system in general and the unique constraints of ANDROID™ application development.

In certain embodiments, the instrumentation methods may ensure that the system core library classes are not instrumented. Instead, a wrapping or routing class is used to wrap around the original system libraries. In certain embodiments, wrapping or routing classes may re-route to instrumentation-specific, equivalent classes.

Several instrumentation methods may be available. For example, instrumentation of ANDROID™ applications may be enabled using a Super Class or routing class insertion method. In the Super Class insertion method, the ANDROID™ user interface framework methods may explicitly require invocation for its user interface to be rendered correctly. For example, the Android Activity class may mandate that certain methods must call an Activity implementation. These methods may be required to be called in the corresponding overridden methods.

For example, an Android Activity class that is overriding the base Android Activity class (e.g., the "android.app.activity" class) must contain base class calls for the following methods in each corresponding overridden method:

```
onCreate(Bundle savedInstanceState);
onStart( );
onRestart( );
onResume( );
onPause( );
onStop( );
onDestroy( );
onPostCreate(Bundle savedInstanceState);
onPostResume( );
```

In certain embodiments, the implementing class should also invoke the following base class methods in the corresponding implementing methods:

```
onCreateContextMenu(ContextMenu menu, View v,
ContextMenuInfo menuInfo);
onCreateOptionsMenu(Menu menu);
onOptionsItemSelected(MenuItem item);
onContextItemSelected(MenuItem item);
onMenuItemSelected(int featureId, MenuItem item);
```

In certain embodiments, the implementing class should not invoke/override the following base class methods unless you are providing full custom activity state implementation:

```
onSaveInstanceState(Bundle savedInstanceState);
onRestoreInstanceState(Bundle savedInstanceState);
onBackPressed( );
```

In certain embodiments, the application context may need to be gathered and a hook into the instance creation is required (e.g., onCreate( )) in order to initialize runtime and begin the harvesting thread. Inserting a runtime wrapper class (e.g., WrapperApplication class) may accomplish these tasks. It is also important to know whether the ANDROID™ application has an overridden application class. In such cases a "routing" class may be inserted, and the manifest file (e.g., AndroidManifest.xml) may be updated.

In certain embodiments, it is easier to instrument these classes if a custom routing class is inserted in the class hierarchy because of all the hooks provided on the base Application class. For example, certain overridden methods from the Application class may be called at each event in the Application's lifetime. For example, when the Application is created, onCreate( ) may be invoked in any class implementing the Application class and overriding the base method being invoked.

Figure 5:
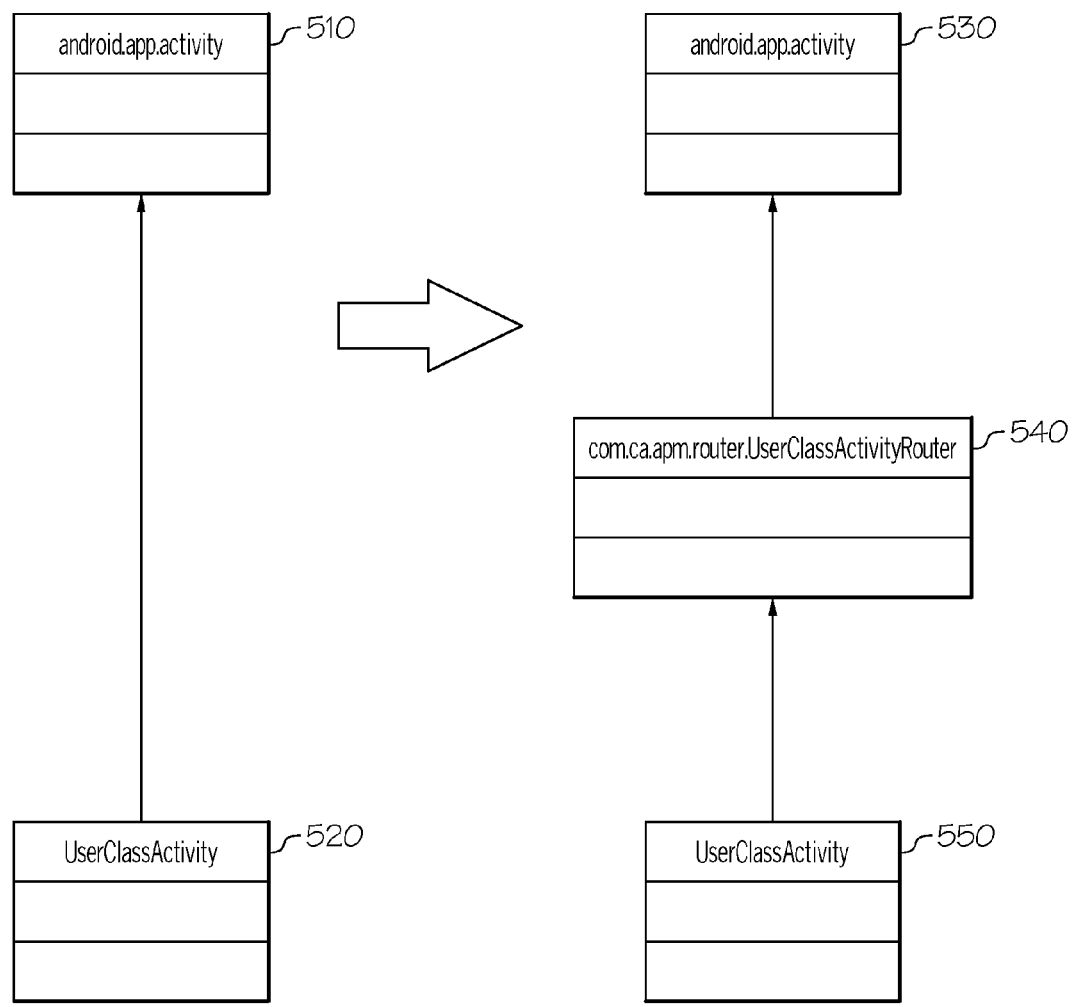
FIG. 5 illustrates a UML diagram of super class insertion for an activity class in accordance with a non-limiting embodiment of the present disclosure.

As illustrated in FIG. 5 a routing class 540 implements Android base Activity class 530 (i.e., android.app.activity), and the application class 550 (i.e., UserClassActivity) implements routing class 540. Thus, for each application class instance, a hook to critical events for instantiation of instrumentation objects is provided. Further, other critical events in the application class lifetime may be routed to corresponding instrumentation methods.

In certain embodiments, an instrumentation method includes method wrapping. Method wrapping includes wrapping the original method call with a custom method implementation. The original method may be called from inside the wrapping method.

In certain embodiments, classes may be shared across processes until they are modified. When the class is modified, it is then copied and realigned at a new location by the Zygote process. This in turn increases the burden on memory and other limited resources. Thus, since modifying classes increases memory usage and decreases memory availability, it may be less desirable to design instrumentation classes in such a way that they the number of times that the Zygote process writes to memory.

In certain embodiments, the instrumentation method includes class wrapping. As discussed above, modifying classes may increase resource utilization because of the copy on write functionality of the Zygote process. Class wrappers may enable modification of class functionality with actually modifying the underlying class.

For example, the HttpURLConnection/HttpsURLConnection classes may be wrapped. A custom routing class may be derived from these classes and used for data inspection (e.g., HttpURLConnectionRouter and HttpsURLConnectionRouter). A URLRouter class may implement java.net.URL and wrap the functionality of the system URL class. In this example, the URLRouter.openConnection( ) method would return HttpURLConnectionRouter and HttpURLConnectionRouter instances.

In certain embodiments, the wrapped classes replace application calls to the base classes. For example, URL.openConnection( ) calls would be replaced with URLRouter.openConnection( ) method calls. In this example, URLRouter.openConnection( ) method calls would return instances of the wrapped HttpURLConnectionRouter and HttpsURLConnectionRouter classes instead of the base HttpUrlConnection and HttpURLConnection classes.

In certain embodiments, router generation may be used to create the routing classes used in instrumenting ANDROID™ applications. For example, router classes may be generated by the Probe Manager to re-route the application flow through tracer classes. Information required for instrumentation may be extracted and used for application performance management.

For example, application performance management software providers may provide tracer classes. The router classes may re-route application flow through such tracer classes. The information gathered by the tracer classes may include method timing information, method name, method parameters, HTTP request/response details, and any other application information that may be required.

In certain embodiments, router classes may be generated for Activity and Application classes. For example, an Application router class may be created as an abstract class derived from either a user created application class implementing the android.app.application class, or as a final class from the android.app.application class.

In certain embodiments, the onCreate( ) method of the router class may call static functions of instrumentation classes provided by application performance management Probe software classes. For example, the onCreate( ) method of a router class may call methods provided by application performance management applications. For example, code in the router class overriding the onCreate( ) method of the base class may call a static method of an application performance management Probe runtime class. This Probe class function may create a harvesting thread and then return immediately. Thus, this class call may have a minimal effect on limited system resources.

Figure 6:
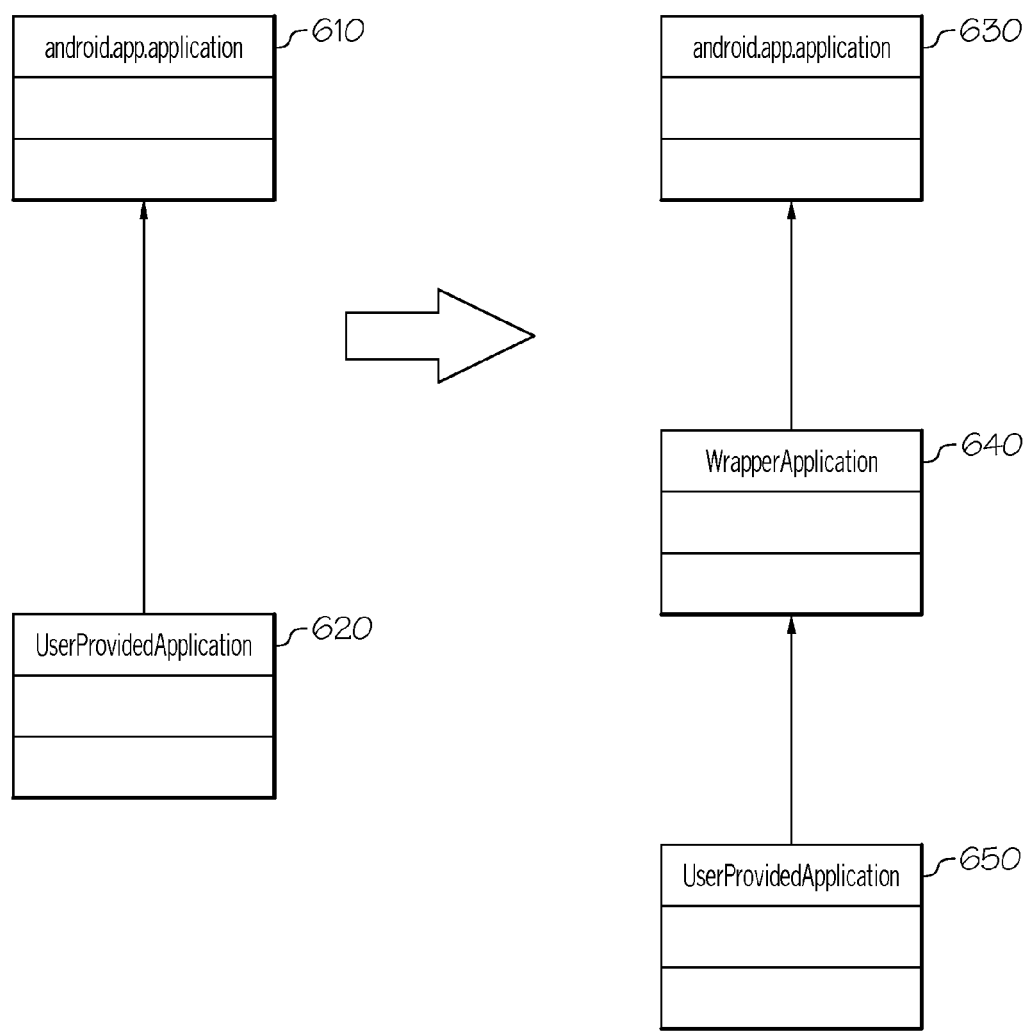
FIG. 6 illustrates super class insertion for an application class in accordance with a non-limiting embodiment of the present disclosure.

This approach is illustrated with reference to FIG. 6. Application router wrapping class 640 (i.e., WrapperApplication) is generated by the Probe Manager. Application router wrapping class 640 calls methods of application performance management software during specific events, i.e., method invocations, of UserProvidedApplication 650. For example, the onCreate( ) method of android.app.application class 630 may be wrapped by application router wrapping class 640.

In certain embodiments, application performance management software Probe Manager may generate application router wrapping class 640 for every UserProvidedApplication 650 that needs to be instrumented, for example, the following line of code may create an instance of a router wrapping class in an application performance management system class:

```
byte[ ] classData =
    rcbc.createAbstractClass(routerClassName).whichExtendsClass(superName).addM
    ethod("onCreate").aload(0).invokesuper( ).aload(0).invokestatic("com/ca/apm/mobil
    e/android/runtime/RtMain", "execute", Type.VOID_TYPE, new Type[ ] {
    Type.getObjectType("android/content/Context") }).branchReturn( ).end( ).end( );
```

In certain embodiments, a probe seed may contain configuration details for the Probe Manager to identify methods and classes to be instrumented, the instrumentation method type to use, and target code to insert.

For example, the following text contains these configuration details in an XML file:

```
< Seed>
    <Class name="org/apache/http/client/HttpClient"/>
    <Methods>
        <RouterMethod type="SuperClassInsertion">
            <SourceMethod name="execute"
signature="(Lorg/apache/http/client/methods/HttpUriRequest;)Lorg/apache/http/HttpResponse;"/>
            <RouterMethod
clazz="com/ca/apm/mobile/android/tracers/AndroidHttpClientTracer" name= "execute"
signature="(Lorg/apache/http/client/HttpClient;Lorg/apache/http/client/methods/HttpUriRequest;)Lorg/apache/http/HttpResponse;"/>
        </RouterMethod>
    </Methods>
</Seed>
```

In this example, the probe seed points to org.apache.http.client.HttpClient classes and their methods. Thus, the Probe Manager may interpret this XML file as requesting that routing wrapper classes are generated for HttpClient classes. The probe seed also points to the execute( ) method of the HttpClient class. The configuration file further indicates that the generated wrapper class should route the execute( ) method calls to the com.ca.apm.mobile.android.tracers.AndroidHttpClientTracer class execute method. The configuration file further indicates that the RouterMethod type is SuperClassInsertion.

In certain embodiments, once the wrapper classes are generated, the application performance management code is started when the application is started. The runtime flow starts with WrapperApplication 640. This class provides the Probe Manager with application context.

In certain embodiments, the runtime starts the harvesting thread which executes at a predetermined interval and reports the collected metrics and/or transactions to the collector service over web protocols as JavaScript object notation objects.

In certain embodiments, the collector service is a cloud based HTTP server that listens for connections from a mobile device. The collector service may handle metrics from all types of mobile devices and operating systems, not just ANDROID™. The collector service may then forward these metrics to the enterprise manager. The collector service should be scalable, such that it may handle many connections at a single time.

In certain embodiments, an enterprise manager and/or workstation processes the metrics for an application from thousands of devices. The enterprise manager may provide an aggregated view, and may also need to process the results based on individual devices or groups of devices. For example, the enterprise manager may aggregate crash statistics for various devices and various platforms.

Figure 7A:
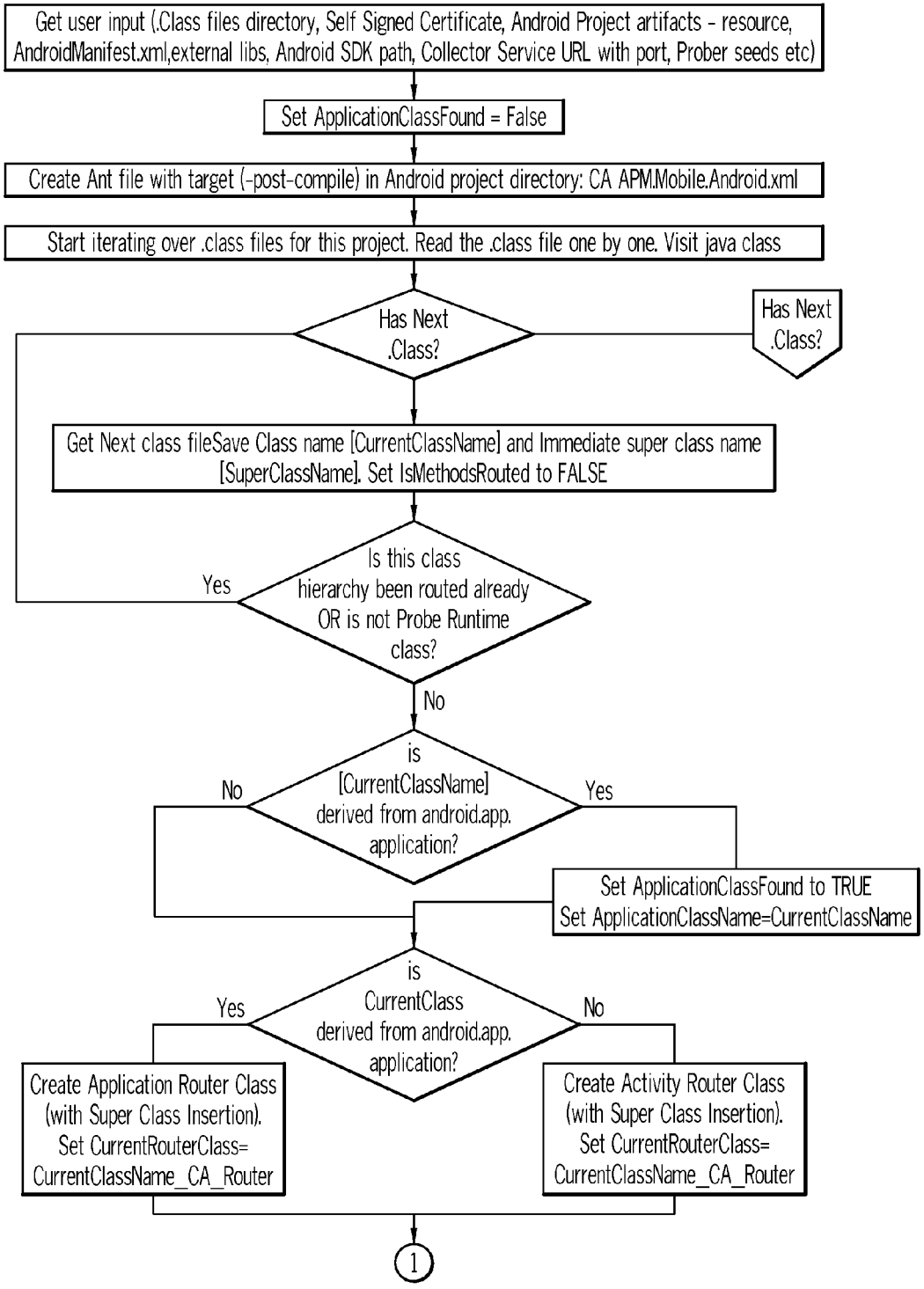
FIG. 7A illustrates a segment of a flow chart for implementing instrumentation for a mobile application in accordance with a non-limiting embodiment of the present disclosure.
Figure 7B:
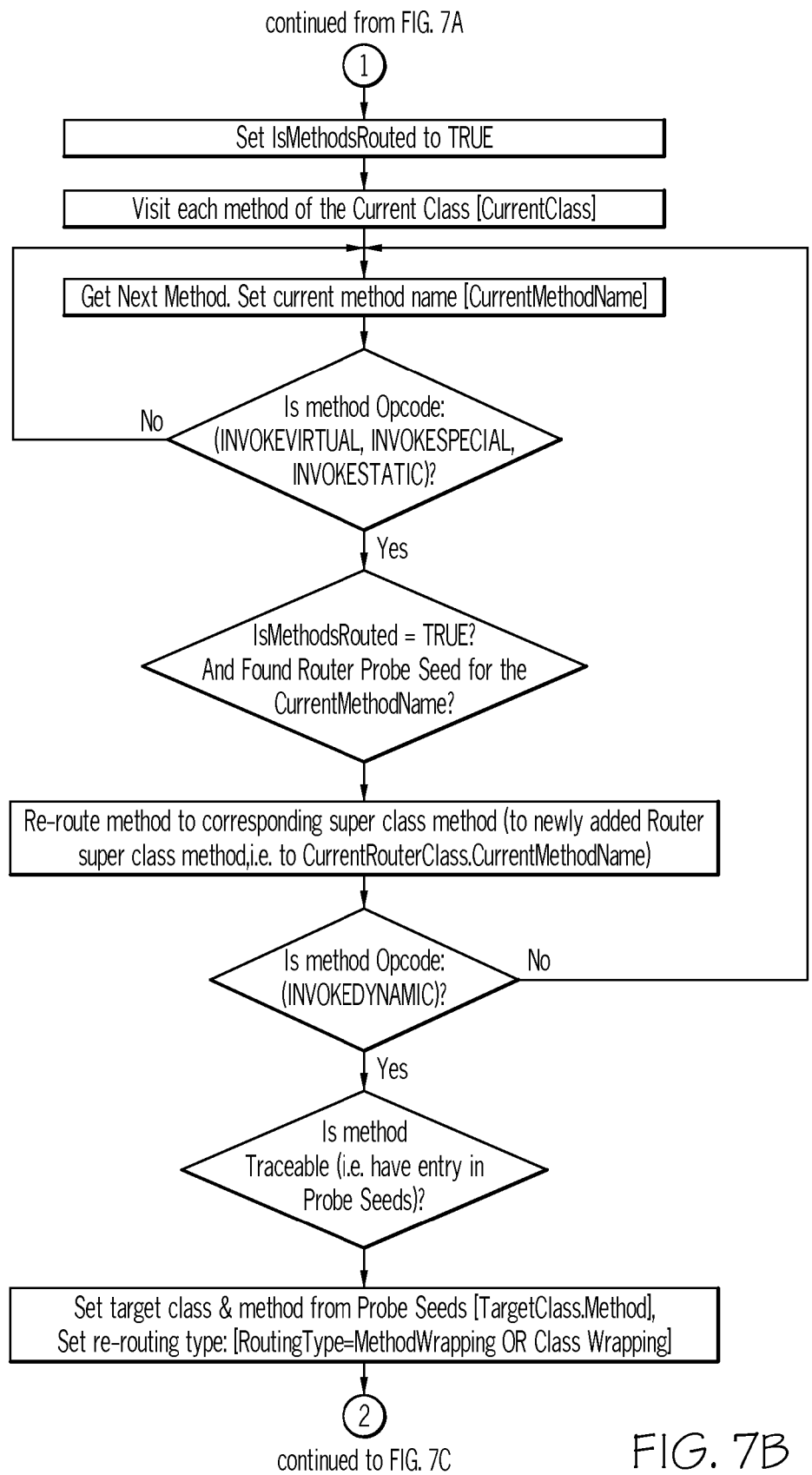
FIG. 7B illustrates a segment of a flow chart for implementing instrumentation for a mobile application in accordance with a non-limiting embodiment of the present disclosure.
Figure 7C:
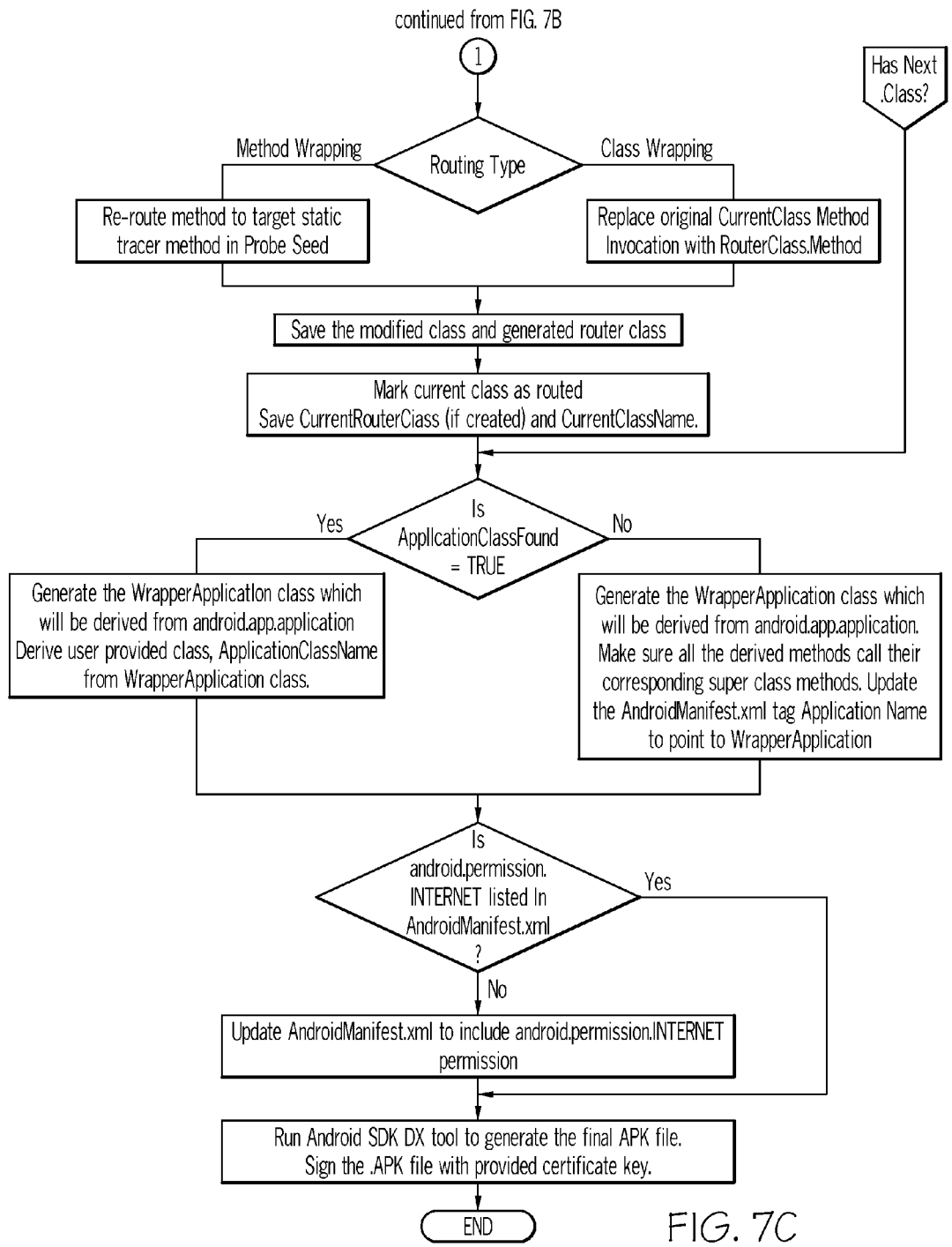
FIG. 7C illustrates a segment of a flow chart for implementing instrumentation for a mobile application in accordance with a non-limiting embodiment of the present disclosure.

With reference to FIGS. 7A-C, a flowchart of a method for modifying mobile application binaries to call external libraries is illustrated. A performance management application may use the process described in this flowchart for instrumenting any type of mobile application deployed within an organization. FIGS. 7A-C give one particular example implementation of the teachings of the present disclosure. The variable names, class names, package names, and other attributes used in FIGS. 7A-C may be modified in further embodiments of the present disclosure. Further, other aspects of the application package may be examined and analyzed and other steps may be taken to insert other external library calls without departing from the scope of the present disclosure.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
   determining an application library method for modification of an application library based on a configuration file, the configuration file specifying areas in application execution where instrumentation is desired, wherein the application library is compiled into bytecode designed for execution on a first virtual machine without access to an external mobile operating system instrumentation library;

generating, using a first environment, a wrapper method for a system library method invoked at the area in application execution, wherein the wrapper method comprises:

an instruction to invoke an instrumentation method in the external mobile operating system instrumentation library that is accessible by a second virtual machine associated with mobile operating systems; and modifying the application for execution on the second virtual machine by replacing an instruction that invokes the system library method with an instruction that invokes the wrapper method, wherein the second virtual machine does not have access to the system library method.

2. The method of claim 1, further comprising:

determining, based on the configuration file, an activity class from the plurality of binary classes, the activity class directly extending a system base activity class and comprising entry points from system execution to application execution;

generating a binary router class for the activity class, wherein the binary router class:

directly extends the system base activity class; and comprises a corresponding method for each of a plurality of activity class methods corresponding to the entry points identified in a configuration file, wherein each corresponding method comprises a fifth instruction to invoke a method on the system base activity class and wherein each corresponding method comprises a sixth instruction to invoke a method in the external mobile operating system instrumentation library;

replacing a seventh instruction that invokes an activity class method from the plurality of activity class methods with an eighth instruction that invokes a corresponding method in the binary router class, wherein a binary class in the plurality of binary classes comprises the seventh binary instruction.

3. The method of claim 1, further comprising:

determining an application class from the plurality of binary classes, the application class directly extending a system base application class;

generating a binary wrapper class for the application class, wherein the binary wrapper class:

directly extends the system application class; and comprises a corresponding method for each of a plurality of application class methods identified in the configuration file, wherein each corresponding method contains a copy of binary instructions from a method in the plurality of application class methods and wherein each corresponding method comprises a fifth instruction to invoke a method in another external library; and replacing a sixth instruction that invokes an application class method from the plurality of application class methods with a seventh instruction that invokes a corresponding method in the binary wrapper class, wherein a binary class from the plurality of binary classes comprises the sixth instruction.

4. The method of claim 1, further comprising:

determining a system library class based on the configuration file;

generating a wrapper class for the system library class, wherein the wrapper class:

directly extends the system library class; and comprises a corresponding method for each of a plurality of system library class methods identified in the configuration file, wherein each corresponding method contains a fifth instruction to invoke a method on the system library class, and wherein each corresponding method comprises a sixth instruction to invoke a method in another external library; and replacing a seventh instruction that invokes a system library class method from the plurality of system library class methods with an eighth binary instruction that invokes a corresponding method in the wrapper class, wherein a binary class from the plurality of binary classes comprises the seventh instruction.

5. The method of claim 1, wherein the external mobile operating system instrumentation library is an application performance management library.

6. The method of claim 1, wherein the application library is a mobile operating system application library.

7. The method of claim 1, wherein the application library and the external mobile operating system instrumentation library are deployed on a mobile operating system, and wherein the external mobile operating system instrumentation library comprises a proxy configured to call a remote application performance management library service.

8. A computer configured to access a storage device, the computer comprising:

a processor; and a non-transitory, computer-readable storage medium storing computer-readable instructions that when executed by the processor cause the computer to perform:

determining an application library method for modification of an application library based on a configuration file, the configuration file specifying areas in application execution where instrumentation is desired, wherein the application library is compiled into bytecode designed for execution on a first virtual machine without access to an external mobile operating system instrumentation library;

generating, using a first environment, a wrapper method for a system library method invoked at the area in application execution, wherein the wrapper method comprises:

an instruction to invoke an instrumentation method in the external mobile operating system instrumentation library that is accessible by a second virtual machine associated with mobile operating systems; and modifying the application for execution on the second virtual machine by replacing an instruction that invokes the system library method with an instruction that invokes the wrapper method, wherein the second virtual machine does not have access to the system library method.

9. The computer of claim 8, wherein the computer-readable instructions further cause the computer to perform:

determining, based on the configuration file, an activity class from the plurality of binary classes, the activity class directly extending a system base activity class and comprising entry points from system execution to application execution;

generating a binary router class for the activity class, wherein the binary router class:
  directly extends the system base activity class; and
  comprises a corresponding method for each of a plurality of activity class methods corresponding to the entry points identified in a configuration file, wherein each corresponding method comprises a fifth instruction to invoke a method on the system base activity class and wherein each corresponding method comprises a sixth instruction to invoke a method in the external mobile operating system instrumentation library;
replacing a seventh instruction that invokes an activity class method from the plurality of activity class methods with an eighth instruction that invokes a corresponding method in the binary router class, wherein a binary class in the plurality of binary classes comprises the seventh binary instruction.

10. The computer of claim 8, wherein the computer-readable instructions further cause the computer to perform:
determining an application class from the plurality of binary classes, the application class directly extending a system base application class;
generating a binary wrapper class for the application class, wherein the binary wrapper class:
  directly extends the system application class; and
  comprises a corresponding method for each of a plurality of application class methods identified in the configuration file, wherein each corresponding method contains a copy of binary instructions from a method in the plurality of application class methods and wherein each corresponding method comprises a fifth instruction to invoke a method in another external library; and
replacing a sixth instruction that invokes an application class method from the plurality of application class methods with a seventh instruction that invokes a corresponding method in the binary wrapper class, wherein a binary class from the plurality of binary classes comprises the sixth instruction.

11. The computer of claim 8, wherein the computer-readable instructions further cause the computer to perform:
determining a system library class based on the configuration file;
generating a wrapper class for the system library class, wherein the wrapper class:
  directly extends the system library class; and
  comprises a corresponding method for each of a plurality of system library class methods identified in the configuration file, wherein each corresponding method contains a fifth instruction to invoke a method on the system library class, and wherein each corresponding method comprises a sixth instruction to invoke a method in another external library; and
replacing a seventh instruction that invokes a system library class method from the plurality of system library class methods with an eighth binary instruction that invokes a corresponding method in the wrapper class, wherein a binary class from the plurality of binary classes comprises the seventh instruction.

12. The computer of claim 8, wherein the external mobile operating system instrumentation library is an application performance management library.

13. The computer of claim 8, wherein the application library is a mobile operating system application library.

14. The computer of claim 8, wherein the application library and the external mobile operating system instrumentation library are deployed on a mobile operating system, and wherein the external mobile operating system instrumentation library comprises a proxy configured to call a remote application performance management library service.

15. A computer program product comprising:
a non-transitory computer-readable storage medium having computer-readable program code embodied therewith, the computer-readable program code comprising:
  computer-readable program code configured to determine an application library method for modification of an application library based on a configuration file, the configuration file specifying areas in application execution where instrumentation is desired, wherein the application library is compiled into bytecode designed for execution on a first virtual machine without access to an external mobile operating system instrumentation library;
  computer-readable program code configured to generate, using a first environment, a wrapper method for a system library method invoked at the area in application execution, wherein the wrapper method comprises:
    an instruction to invoke an instrumentation method in the external mobile operating system instrumentation library that is accessible by a second virtual machine associated with mobile operating systems; and
  computer-readable program code configured to modify the application for execution on the second virtual machine by replacing an instruction that invokes the system library method with an instruction that invokes the wrapper method, wherein the second virtual machine does not have access to the system library method.

16. The computer program product of claim 15, wherein the computer-readable program code further comprises:
computer-readable program code configured to determine, based on the configuration file, an activity class from the plurality of binary classes, the activity class directly extending a system base activity class and comprising entry points from system execution to application execution;
computer-readable program code configured to generate a binary router class for the activity class, wherein the binary router class:
  directly extends the system base activity class; and
  comprises a corresponding method for each of a plurality of activity class methods corresponding to the entry points identified in a configuration file, wherein each corresponding method comprises a fifth instruction to invoke a method on the system base activity class and wherein each corresponding method comprises a sixth instruction to invoke a method in the external mobile operating system instrumentation library;
computer-readable program code configured to replace a seventh instruction that invokes an activity class method from the plurality of activity class methods with an eighth instruction that invokes a corresponding method in the binary router class, wherein a binary class in the plurality of binary classes comprises the seventh binary instruction.

17. The computer program product of claim 15, wherein the computer-readable program code further comprises:

computer-readable program code configured to determine an application class from the plurality of binary classes, the application class directly extending a system base application class;

computer-readable program code configured to generate a binary wrapper class for the application class, wherein the binary wrapper class:
- directly extends the system application class; and
- comprises a corresponding method for each of a plurality of application class methods identified in the configuration file, wherein each corresponding method contains a copy of binary instructions from a method in the plurality of application class methods and wherein each corresponding method comprises a fifth instruction to invoke a method in another external library; and computer-readable program code configured to replace a sixth instruction that invokes an application class method from the plurality of application class methods with a seventh instruction that invokes a corresponding method in the binary wrapper class, wherein a binary class from the plurality of binary classes comprises the sixth instruction.

18. The computer program product of claim 15, wherein the computer-readable program code further comprises:

computer-readable program code configured to determine a system library class based on the configuration file;

computer-readable program code configured to generate a wrapper class for the system library class, wherein the wrapper class:
- directly extends the system library class; and
- comprises a corresponding method for each of a plurality of system library class methods identified in the configuration file, wherein each corresponding method contains a fifth instruction to invoke a method on the system library class, and wherein each corresponding method comprises a sixth instruction to invoke a method in another external library; and computer-readable program code configured to replace a seventh instruction that invokes a system library class method from the plurality of system library class methods with an eighth binary instruction that invokes a corresponding method in the wrapper class, wherein a binary class from the plurality of binary classes comprises the seventh instruction.

19. The computer program product of claim 15, wherein the external mobile operating system instrumentation library is an application performance management library.

20. The computer program product of claim 15, wherein the application library and the external mobile operating system instrumentation library are deployed on a mobile operating system, and wherein the external library comprises a proxy configured to call a remote application performance management library service.

\* \* \* \* \*